United States Patent
Arai et al.

(10) Patent No.: US 11,009,700 B2
(45) Date of Patent: May 18, 2021

(54) HEAD-UP DISPLAY APPARATUS

(71) Applicant: CALSONIC KANSEI CORPORATION, Saitama (JP)

(72) Inventors: Kazuo Arai, Saitama (JP); Hiromasa Miura, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 3 days.

(21) Appl. No.: 15/777,709

(22) PCT Filed: Nov. 7, 2016

(86) PCT No.: PCT/JP2016/004823
§ 371 (c)(1),
(2) Date: May 21, 2018

(87) PCT Pub. No.: WO2017/098688
PCT Pub. Date: Jun. 15, 2017

(65) Prior Publication Data
US 2018/0335623 A1    Nov. 22, 2018

(30) Foreign Application Priority Data
Dec. 9, 2015    (JP) .............................. JP2015-240299

(51) Int. Cl.
*G02B 27/01* (2006.01)
*B60K 35/00* (2006.01)

(52) U.S. Cl.
CPC .......... *G02B 27/0101* (2013.01); *B60K 35/00* (2013.01); *G02B 27/01* (2013.01);
(Continued)

(58) Field of Classification Search
CPC .... G02B 2027/0112; G02B 2027/0129; G02B 27/01; G02B 27/0101
(Continued)

(56) References Cited

U.S. PATENT DOCUMENTS

2005/0157398 A1    7/2005  Nagaoka et al.
2005/0259301 A1*  11/2005  Aoki .................. G02B 27/0149
                                                    359/13
(Continued)

FOREIGN PATENT DOCUMENTS

JP    H0496778 A     3/1992
JP    2001301491 A  10/2001
(Continued)

OTHER PUBLICATIONS

Jun. 12, 2018, International Preliminary Report on Patentability issued in the International Patent Application No. PCT/JP2016/004823.
(Continued)

*Primary Examiner* — Brandi N Thomas
(74) *Attorney, Agent, or Firm* — Kenja IP Law PC

(57) ABSTRACT

A head-up display apparatus reduces the trouble caused by horizontal separation of a display image. The head-up display apparatus (1) includes a display source (2) inside an instrument panel (6), an opening (7) on the instrument panel (6), display light from the display source (2) being emitted through the opening (7), and an opening cover (5) provided around the opening (7). At horizontal ends (51, 53) of the opening cover (5), a change in color or reflectance is provided from the opening sides (52a, 54a) towards the outer sides (52b, 54b).

9 Claims, 10 Drawing Sheets

(52) U.S. Cl.
CPC ..... *B60K 2370/1529* (2019.05); *B60K 2370/188* (2019.05); *B60K 2370/334* (2019.05); *B60K 2370/736* (2019.05); *G02B 2027/0112* (2013.01); *G02B 2027/0129* (2013.01)

(58) Field of Classification Search
USPC .................................................. 359/619–633
See application file for complete search history.

(56) References Cited

U.S. PATENT DOCUMENTS

| | | | |
|---|---|---|---|
| 2014/0268359 A1* | 9/2014 | Yuki ............... | G02B 27/0101 359/631 |
| 2015/0248796 A1* | 9/2015 | Iyer ................ | G07C 9/00309 340/5.61 |
| 2016/0089978 A1 | 3/2016 | Takahashi | |
| 2016/0221498 A1* | 8/2016 | Vourlat ........... | B60K 35/00 |

FOREIGN PATENT DOCUMENTS

| | | | |
|---|---|---|---|
| JP | 2005202145 A | 7/2005 | |
| JP | 2014174416 A | 9/2014 | |
| JP | 2016000587 A | 1/2016 | |
| WO | 2014200023 A1 | 12/2014 | |

OTHER PUBLICATIONS

Jan. 17, 2017, International Search Report issued in the International Patent Application No. PCT/JP2016/004823.

Sep. 24, 2019, Notification of Reasons for Refusal issued by the Japan Patent Office in the corresponding Japanese Patent Application No. 2015-240299 with English language concise explanation.

\* cited by examiner

HEAD-UP DISPLAY APPARATUS

CROSS-REFERENCE TO RELATED APPLICATION

The present application claims priority to and the benefit of Japanese Patent Application No. 2015-240299 filed Dec. 9, 2015, the entire contents of which are incorporated herein by reference.

TECHNICAL FIELD

The present disclosure relates to a head-up display apparatus.

BACKGROUND

A technique used in a conventional head-up display apparatus displays information in overlap with the foreground that the driver is looking at, such as in patent literature (PTL) 1. This technique allows the driver to observe the display image displayed by the head-up display apparatus and the foreground simultaneously.

CITATION LIST

Patent Literature

PTL 1: JPH0496778A

SUMMARY

Technical Problem

Whereas the focal length of the display image by the head-up display is 1 m to 5 m, the distance to the foreground (road, vehicle in front, building, or the like) is from 5 m to infinity. When the driver observes the foreground, therefore, the display image or a reflected image of the opening cover is observed as being separated in the horizontal direction due to parallax of the eyes, which is troublesome for the driver.

The present disclosure has been made in light of the aforementioned problem and aims to provide a head-up display apparatus that can reduce the trouble caused by horizontal separation of a virtual image visible to the driver.

Solution to Problem

To solve the aforementioned problem, a head-up display apparatus according to an embodiment of the present disclosure includes:

a display source inside an instrument panel;

an opening on the instrument panel, display light from the display source being emitted through the opening; and an opening cover provided around the opening;

wherein at horizontal ends of the opening cover, a change in color or reflectance is provided from the opening side towards an outer side.

Advantageous Effect

The head-up display apparatus according to an embodiment of the present disclosure can reduce the trouble caused by horizontal separation of a virtual image of an opening cover visible to the driver.

DETAILED DESCRIPTION

A first embodiment of the present disclosure is described below.

First Embodiment

Figure 1:
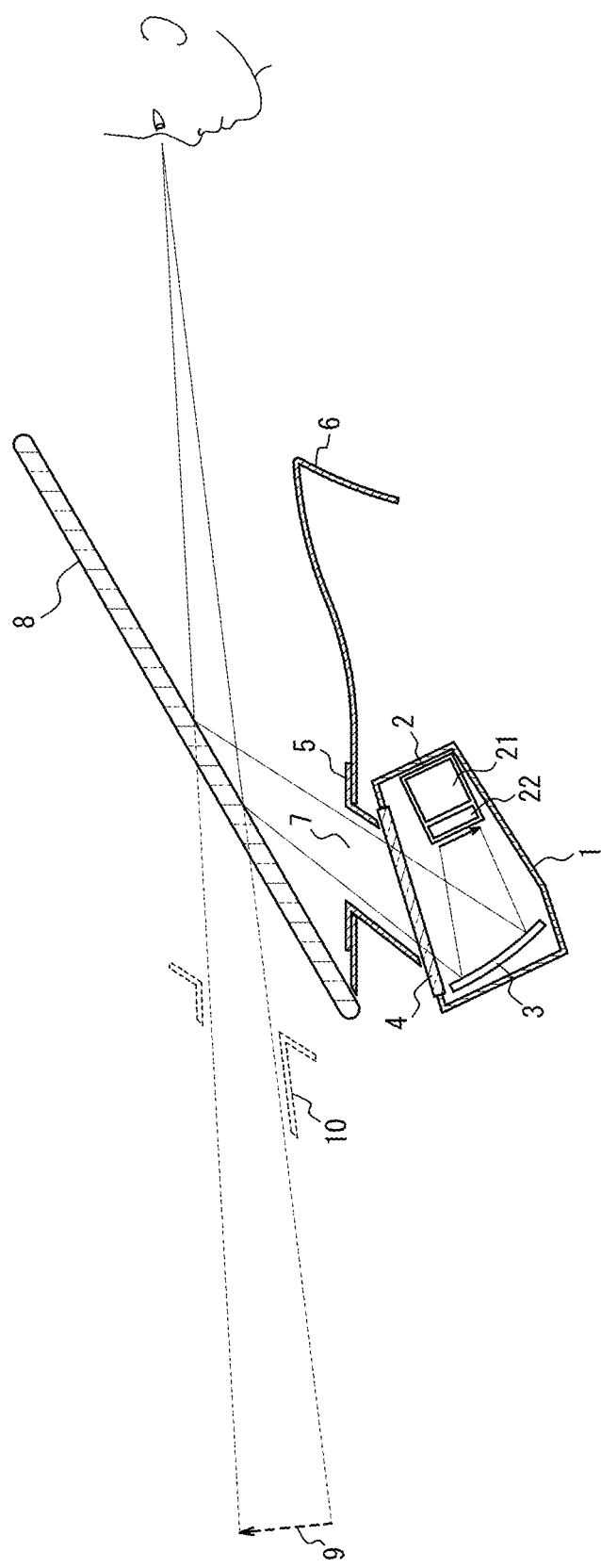
FIG. 1 is a general overview of a head-up display apparatus according to a first embodiment.

FIG. 1 is a general overview of a head-up display apparatus 1 according to the first embodiment of the present disclosure. In general terms, the head-up display apparatus 1 according to the first embodiment reduces the trouble caused mainly in the afternoon by horizontal separation of a virtual image. The head-up display apparatus 1 according to an embodiment of the present disclosure is provided inside a vehicle and includes a display source 2, a reflecting member 3, a transparent cover 4, and an opening cover 5. Specifically, the head-up display apparatus 1 is provided inside an instrument panel 6 of the vehicle farther forward in the vehicle travel direction than the meters.

The display source 2 includes a backlight 21 and a liquid crystal display (LCD) 22. The display source 2 projects display light towards the reflecting member 3. The display source 2 is not limited to this configuration and may, for example, be constituted by a light emitting diode (LED) or the like.

As illustrated in FIG. 1, the reflecting member 3 is provided on the optical path of display light from the display source 2 and reflects display light projected from the display source 2 through the transparent cover 4 towards a front windshield 8. The reflecting member 3 in the present embodiment is described as being a concave mirror that enlarges the display image, but this example is not limiting. For example, the reflecting member 3 may be constituted by a plane mirror.

The transparent cover 4 and the opening cover 5 are provided between the head-up display apparatus 1 and an opening 7 to prevent dirt or the like from entering the head-up display apparatus 1 and the instrument panel 6 through the opening 7. The opening 7 is provided in the instrument panel 6 so the display light from the reflecting member 3 is projected on the front windshield 8.

The front windshield 8 reflects the display light from the reflecting member 3 towards the driver. The driver sees a virtual image formed by the reflected display light in front of the vehicle, i.e. a display image 9.

A reflected image of the opening cover 5, i.e. a virtual image 10, is also formed in front of the vehicle in addition to the display image 9. The virtual image 10 is more clearly visible during the day, for example, when the opening cover 5 is exposed to at least a certain amount of outside light.

Figure 2:
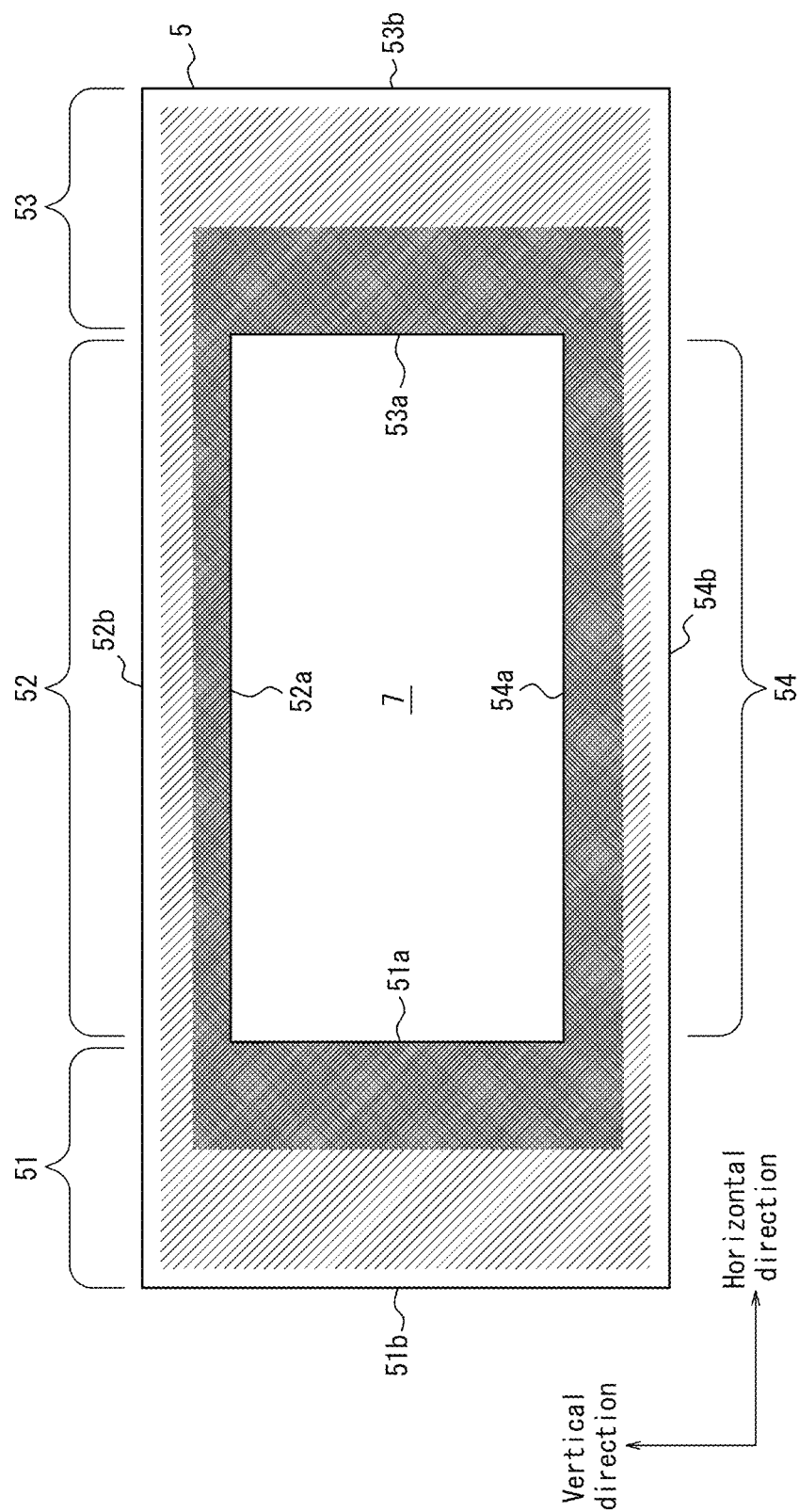
FIG. 2 is a top view of an opening cover of the head-up display apparatus according to the first embodiment.

FIG. 2 is a top view of the opening cover 5. The opening cover 5 is provided around the opening 7. At the horizontal ends (51, 53) of the opening cover 5, a change in color is provided from the opening sides (51a, 53a) towards the outer sides (51b, 53b). In the present embodiment, a gradation changing from black to the color of the instrument panel 6 is provided from the opening sides (51a, 53a) towards the outer sides (51b, 53b). The color of the instrument panel 6 is, for example, gray. The gradation provided in FIG. 2 has three stages of color tones but may instead have two stages or four or more stages.

At the vertical ends (52, 54) of the opening cover 5 in FIG. 2, a change in color is also provided from the opening sides (52a, 54a) towards the outer sides (52b, 54b). In the present embodiment, a gradation changing from black to the color of the instrument panel 6 is provided from the opening sides (52a, 54a) towards the outer sides (52b, 54b).

Figure 3:
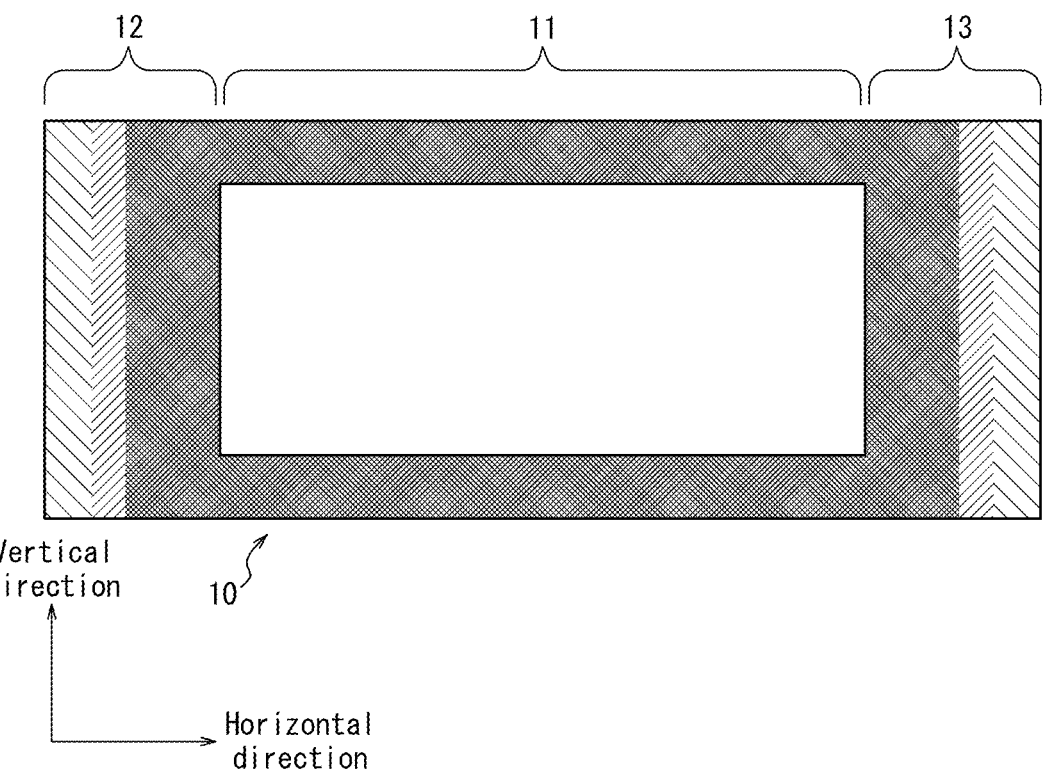
FIG. 3 illustrates a virtual image of the opening cover, visible to the driver, by the head-up display apparatus according to the first embodiment.

FIG. 3 illustrates the virtual image 10 of the opening cover 5 visible to the driver. The virtual image 10 includes a central portion 11, corresponding to the opening 7, and peripheral portions (12, 13). Since outside light is not reflected by the opening 7, the foreground of the vehicle and the display image by the head-up display apparatus 1 can be seen in the central portion 11. Outside light is, however, reflected by the opening cover 5 in the peripheral portions. Nearly no outside light is reflected at the opening sides (51a, 53a) in the present embodiment, because the gradation changing from black to the color of the instrument panel 6 is provided from the opening sides (51a, 53a) towards the outer sides (51b, 53b) of the opening cover 5. On the other hand, outside light is reflected by the outer sides (51b, 53b) of the opening cover 5 in the same way as by the instrument panel 6. Therefore, as illustrated in FIG. 3, display of the peripheral portions (12, 13) of the virtual image 10 is blurred. Because of the display of the peripheral portions (12, 13) of the virtual image 10 being blurred, it is unclear whether the peripheral portions (12, 13) are separated, even when the virtual image 10 is separated horizontally due to parallax of the eyes. An embodiment of the present disclosure thus reduces the trouble caused by horizontal separation of the virtual image visible to the driver by providing a change in color from the opening sides (51a, 53a) towards the outer sides (51b, 53b) in the opening cover 5.

In the present embodiment, a change in color at the vertical ends (52, 54) of the opening cover 5 is also provided from the opening sides (52a, 54a) towards the outer sides (52b, 54b). Therefore, since display of both the horizontal edges and the vertical edges of the virtual image 10 is blurred, the driver can see the virtual image with less discomfort.

Figure 4:
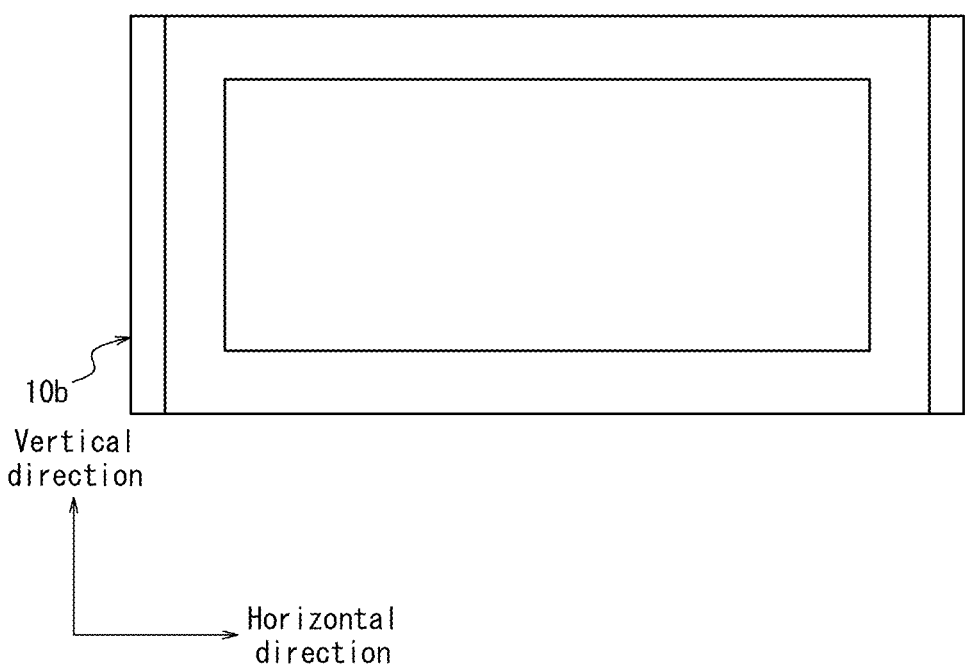
FIG. 4 illustrates a virtual image of the opening cover visible to the driver in a comparative example.

The virtual image when the opening cover 5 is not provided with a change in color is illustrated as a comparative example. FIG. 4 illustrates a virtual image 10b of an opening cover visible to the driver in the comparative example. The virtual image 10b is observed when the driver observes the foreground. As illustrated in FIG. 4, the virtual image 10b, which is a reflection of the opening cover, is separated horizontally due to parallax of the eyes.

Figure 5:
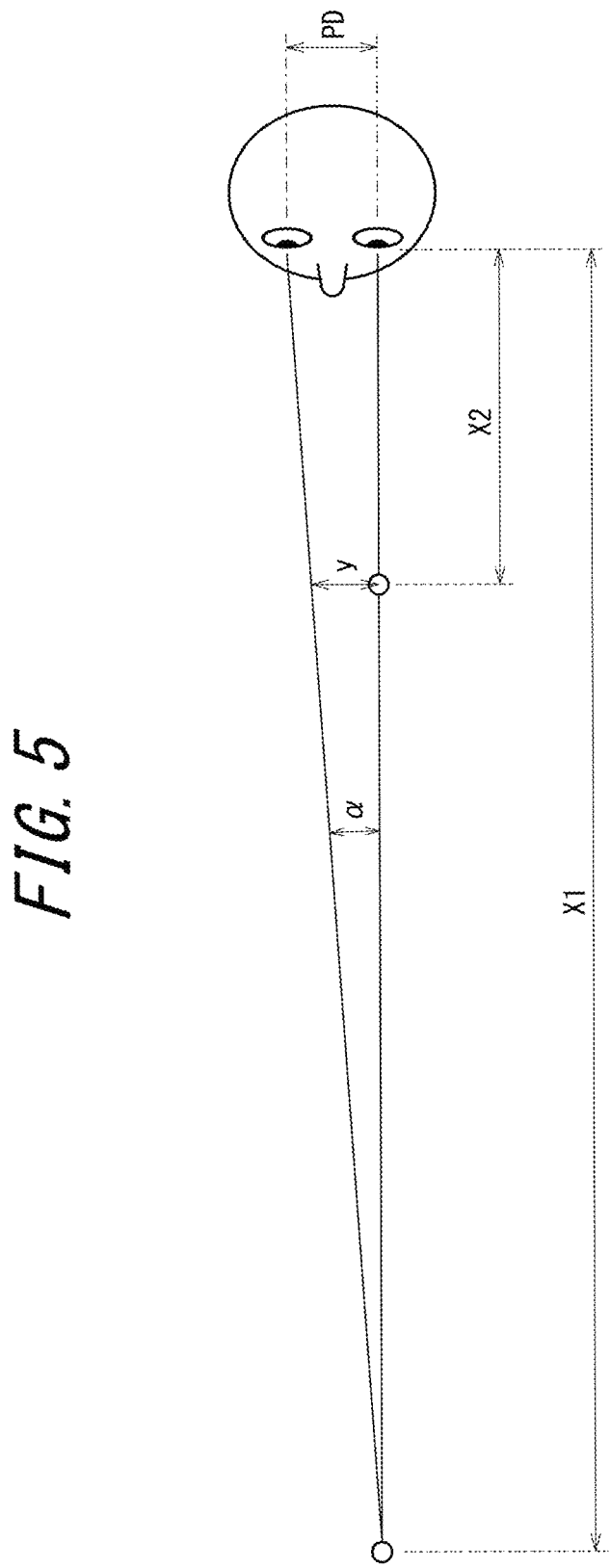
FIG. 5 illustrates the separation width in the case of observing the background.

The width of the region provided with a change in color in the opening cover 5 (the distance between 51a and 51b and the distance between 53a and 53b in FIG. 2, hereinafter the gradation region) is preferably substantially identical to the width by which the foreground is separated due to parallax of the eyes (hereinafter the separation width). FIG. 5 illustrates the separation width in the case of observing the background. In FIG. 5, the distance to a target in the background is X1, the distance to a target in the foreground is X2, the driver's pupillary distance is PD, the angle between line segments connecting the eyes with the target in the background is α, and the separation width is y. Expressions (1) and (2) below hold for these parameters.

$$\alpha = \arctan\left(\frac{PD}{X1}\right) \qquad (1)$$

$$y = \tan(\alpha) \times (X1 - X2) \qquad (2)$$

For example, when X1 is infinity, Approximate Expression (3) below follows from Expressions (1) and (2) above, because X1 is greater than X2.

$$y \approx PD \qquad (3)$$

Typically, the pupillary distance PD is approximately 60 mm to 70 mm. The width of the gradation region is therefore preferably substantially equal to y, i.e. approximately 60 mm to 70 mm. The width of the gradation region can prevent separation of the peripheral portions (12, 13) by being equal to or greater than y.

Expression (4) below expresses the minimum value of the width of this region (ymin), where the driver's visual acuity is VA.

$$y_{min} = \tan\left(\frac{1/VA}{60}\right) \times X2 \qquad (4)$$

For example, if the visual acuity is 0.7, the minimum value of y is expressed by Expression (5) below.

$$y_{min} = \tan(0.024) \times X2 \qquad (5)$$

Figure 6:
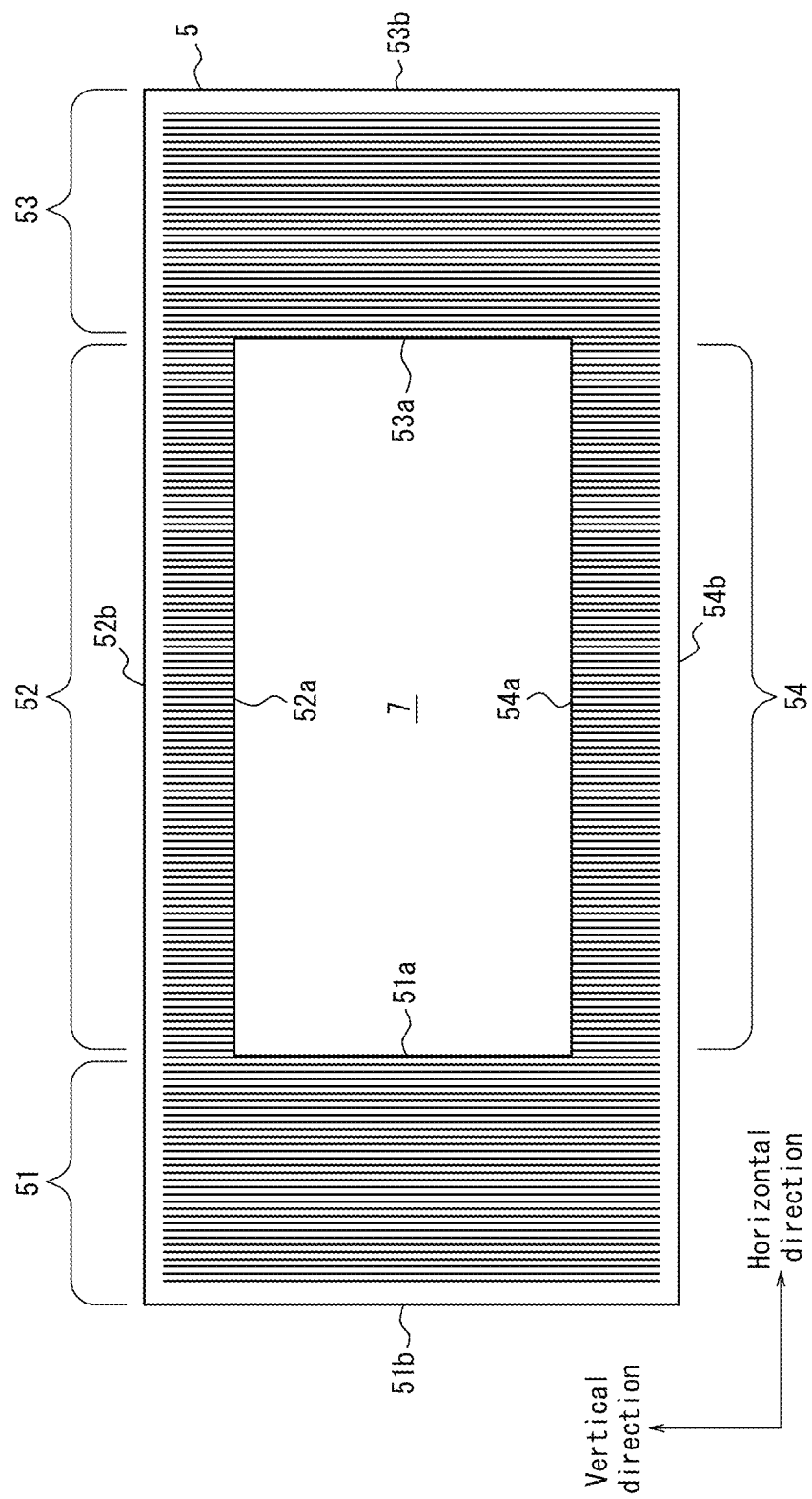
FIG. 6 is a first modification to the opening cover.

In the above embodiment, a gradation changing from black to the color of the instrument panel 6 is provided from the opening sides (52a, 54a) towards the outer sides (52b, 52b) of the opening cover 5, but this example is not limiting. FIG. 6 illustrates a first modification to the opening cover 5. As illustrated in FIG. 6, the change in color may be provided by a pattern of vertical, black stripes from the opening sides (52a, 54a) towards the outer sides (52b, 52b) of the opening cover 5. In this case, the width of the stripes need not be constant and may, for example, increase as the stripes are closer to the opening and decrease towards the outer sides. The peripheral portions, i.e. the edge portions, of the virtual image are blurred by these stripes as well, thereby reducing the trouble caused by horizontal separation of the virtual image visible to the driver.

Figure 7:
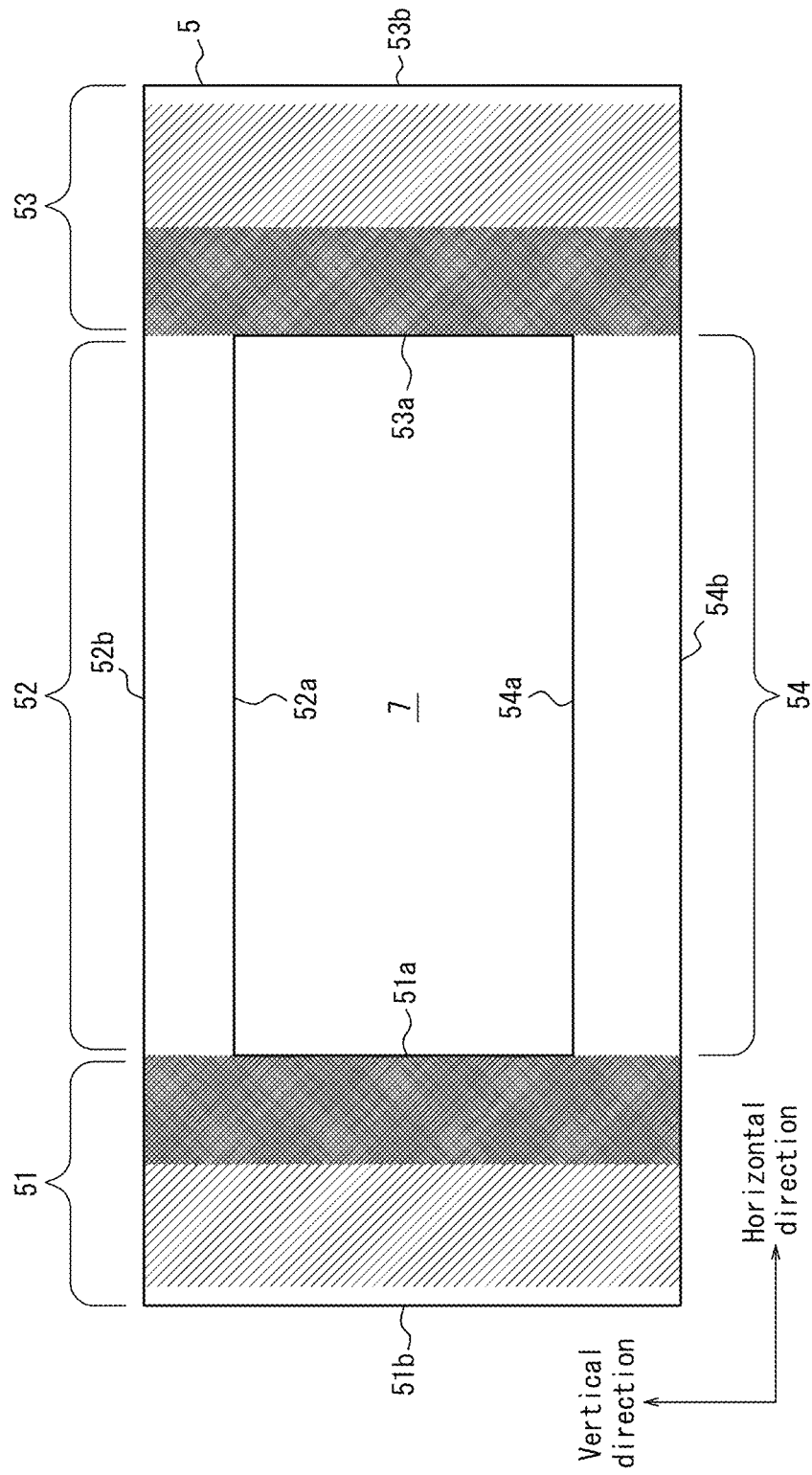
FIG. 7 is a second modification to the opening cover.

FIG. 7 illustrates a second modification to the opening cover 5. In the second modification, a change in color is not provided at the vertical ends (52, 54), but rather only at the horizontal ends (51, 53) from the opening sides (51a, 53a) towards the outer sides (51b, 53b). Since the virtual image is only separated horizontally due to parallax of the eyes, the trouble caused by horizontal separation of the virtual image visible to the driver can also be reduced when a change in color is only provided horizontally.

Figure 8:
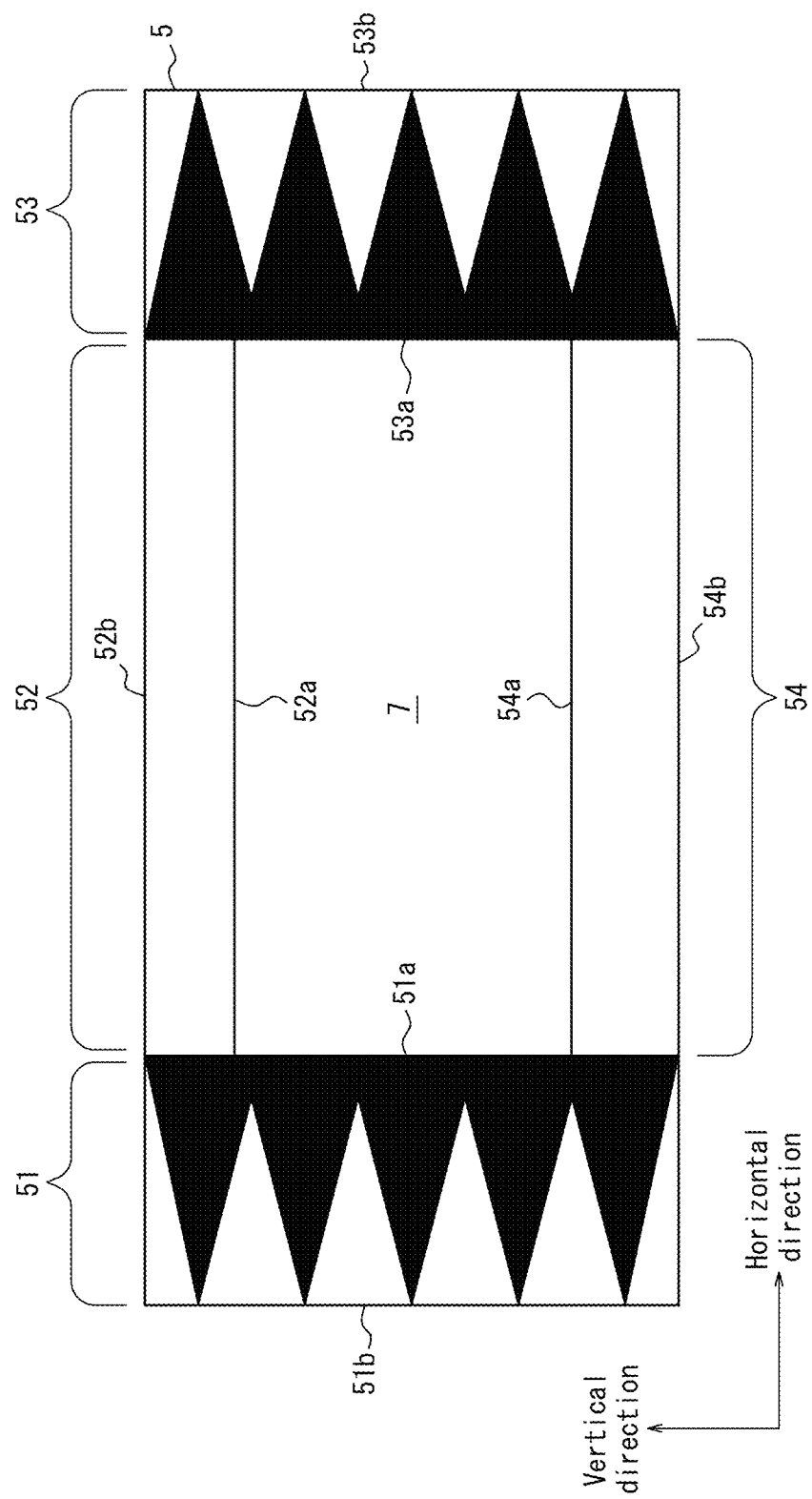
FIG. 8 is a third modification to the opening cover.

FIG. 8 illustrates a third modification to the opening cover 5. In the third modification, a black saw-tooth (zigzag)

pattern is provided at the horizontal ends (51, 53). The peripheral portions of the virtual image with this pattern are less clear than in the aforementioned comparative example, thereby reducing the trouble caused by horizontal separation of the virtual image visible to the driver. Apart from the modifications illustrated here, similar effects can also be obtained by providing a black dotted pattern or mosaic pattern at the horizontal ends (51, 53). In other words, a change in color or change in reflectance is provided in the present embodiment by providing gradation or a pattern, so that the reflectance of outside light varies, at least at the horizontal ends (51, 53) of the opening cover 5. This configuration varies the reflectance of outside light by the opening cover 5 and blurs the display of the peripheral portions in the virtual image of the opening cover 5, thereby reducing the trouble caused by horizontal separation of the virtual image visible to the driver.

Second Embodiment

A second embodiment of the present disclosure is described below. In general terms, a head-up display apparatus 1 according to the second embodiment reduces the trouble caused mainly at night by horizontal separation of a virtual image. Since the overall configuration of the head-up display apparatus 1 is identical to that of the first embodiment, the same reference signs are used, and an explanation is omitted. The head-up display apparatus 1 according to the second embodiment differs from the configuration of the first embodiment in the configuration of the display light exit surface of the display source 2, i.e. the configuration of the liquid crystal display 22 in this case.

Figure 9:
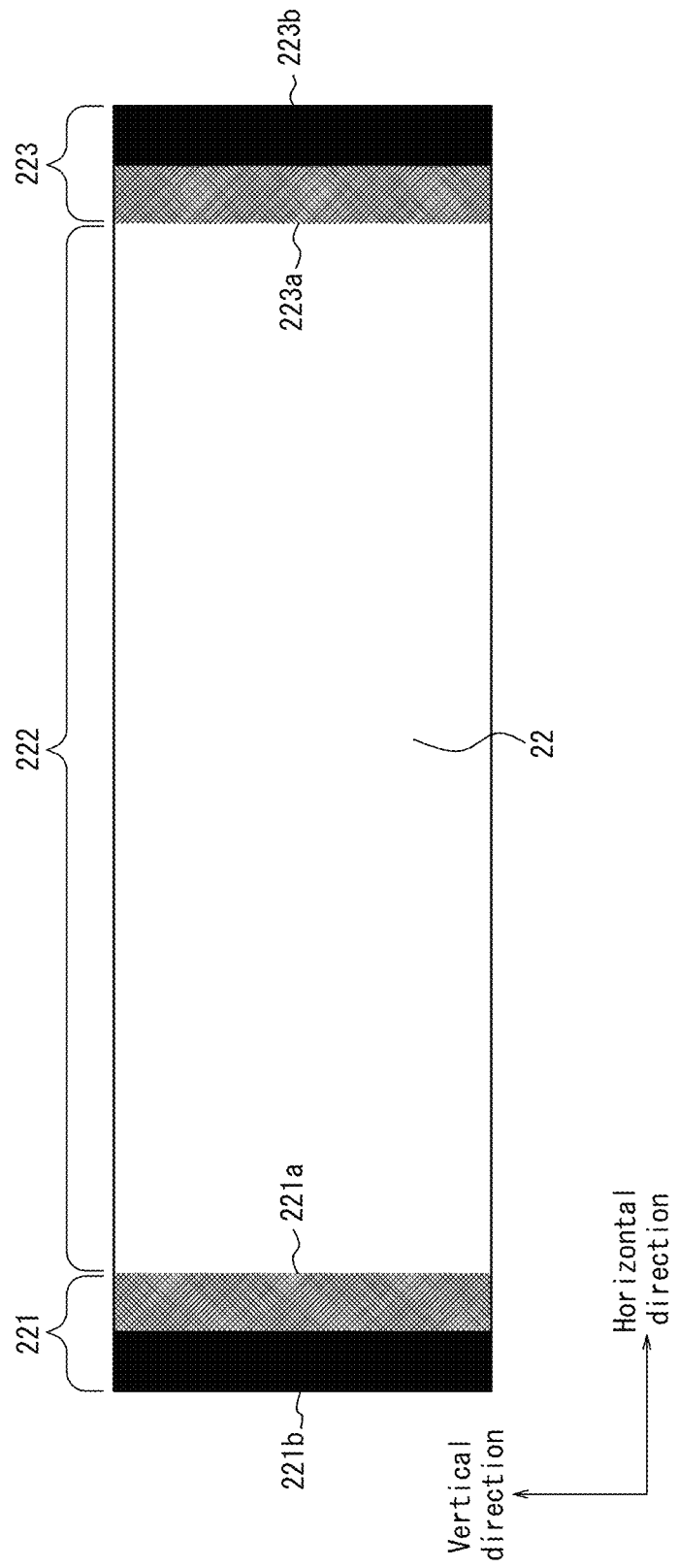
FIG. 9 is a top view of a liquid crystal display 22 of a head-up display apparatus according to a second embodiment.

FIG. 9 is a top view of a liquid crystal display 22 of the head-up display apparatus 1 according to the second embodiment. At the horizontal ends (221, 223) of the liquid crystal display 22 according to the second embodiment, a change in transmittance of the display light is provided from the inner sides (221*a*, 223*a*) towards the outer sides (221*b*, 223*b*) of the exit surface of the display light. Specifically, the provided gradation is such that the transmittance of the display light reduces from the inner sides (221*a*, 223*a*) towards the outer sides (221*b*, 223*b*) of the horizontal ends (221, 223). The change in transmittance is provided by, for example, gradually applying more of a paint with a predetermined transmittance from the inner sides (221*a*, 223*a*) towards the outer sides (221*b*, 223*b*). The gradation provided in FIG. 9 has two stages of transmittance but may instead have three or more stages.

Figure 10:
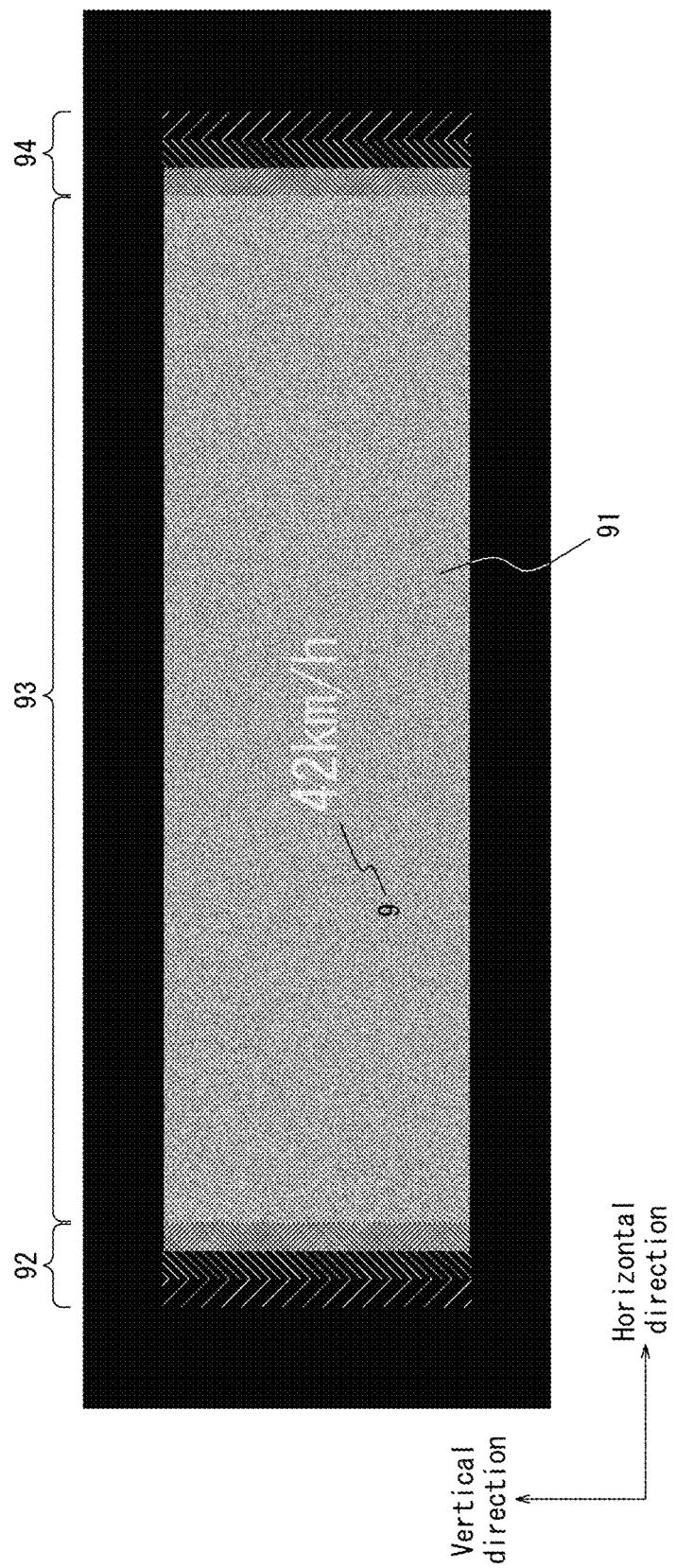
FIG. 10 illustrates a display image visible to the driver by the head-up display apparatus according to the second embodiment.

FIG. 10 illustrates a display image visible to the driver by the head-up display apparatus according to the second embodiment. As illustrated in FIG. 10, the display image displays information such as the vehicle speed (here, 42 km/h). In the background portion 91 other than this information display portion, the luminance cannot be set to zero, which causes this background portion 91 to be visible when the outside light is a predetermined value or less, such as at night. In the present embodiment, a change in transmittance of the display light is provided at the horizontal ends (221, 223) of the liquid crystal display 22. Therefore, the display of the peripheral portions (92, 94) of the display image is blurred. By the display of the peripheral portions (92, 94) of the display image 9 being blurred, the peripheral portions (92, 94) do not appear to be separated, even when the display image 9 is separated horizontally due to parallax of the eyes. An embodiment of the present disclosure thus reduces the trouble caused by horizontal separation of the virtual image visible to the driver by providing a change in transmittance of the display light at the horizontal ends (221, 223) of the liquid crystal display 22.

Figure 11:
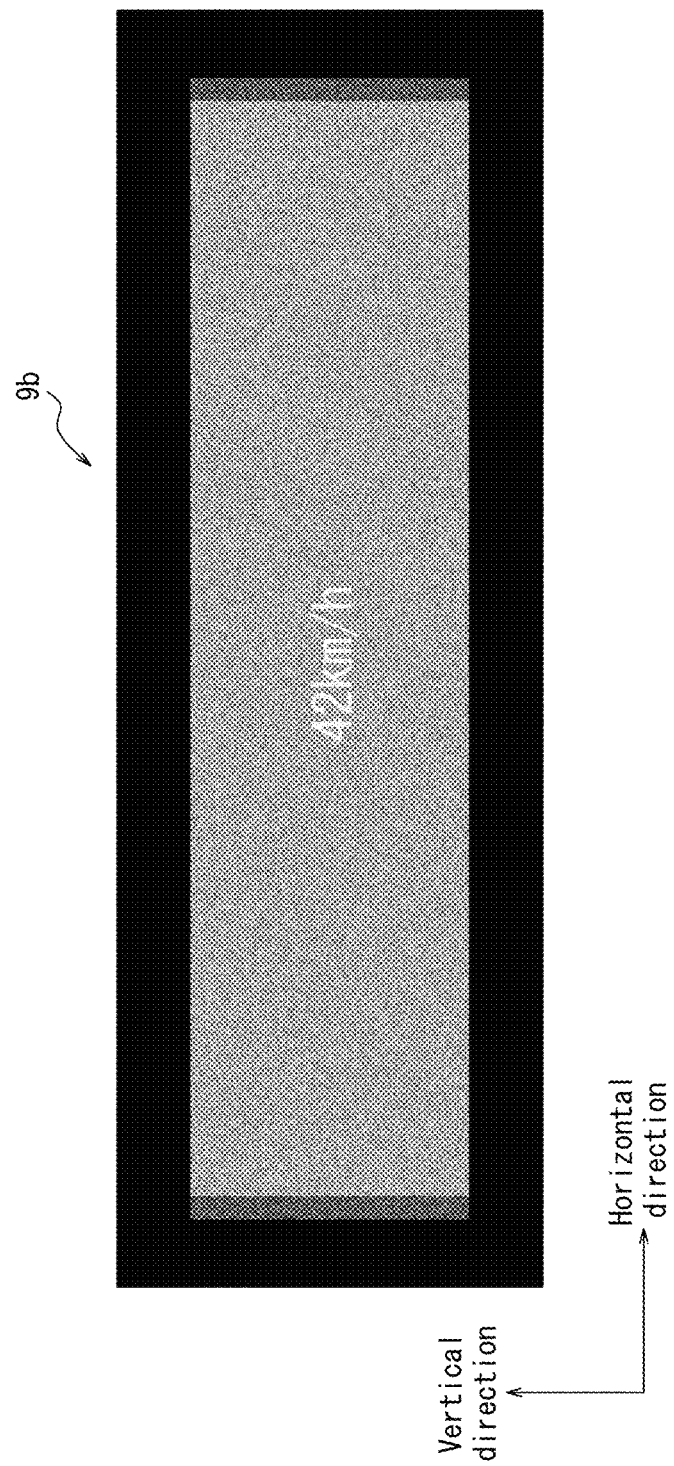
FIG. 11 illustrates a display image visible to the driver in a comparative example.

The case of not providing a change in transmittance of the display light at the horizontal ends of the liquid crystal display 22 is illustrated as a comparative example. FIG. 11 illustrates a display image 9*b* visible to the driver in the comparative example. The display image 9*b* is observed when the driver observes the foreground. As illustrated in FIG. 11, the display image and the reflected image of the opening cover are separated horizontally due to parallax of the eyes.

The width of the region provided with a change in transmittance of the display light at the horizontal ends (221, 223) of the liquid crystal display 22 (the distance between 221*a* and 221*b* and the distance between 223*a* and 223*b* in FIG. 9, hereinafter the second gradation region) is preferably substantially identical to the width of separation due to parallax of the eyes. In other words, the width is preferably substantially identical to y expressed by the above Expressions (1) to (3) in the second gradation region as well. Increasing the width of the second gradation region decreases the area of the central display region 222 (central portion 93 of the display image). Hence, the second gradation region is preferably approximately 60 mm to 70 mm to obtain a sufficient area for the central display region 222. This configuration can ensure the display area of the display image while reducing the trouble caused by horizontal separation of the virtual image visible to the driver.

In the above embodiment, the provided gradation is such that the transmittance of the display light reduces from the inner sides (221*a*, 223*a*) towards the outer sides (221*b*, 223*b*) of the horizontal ends (221, 223) of the liquid crystal display 22, but this example is not limiting. Like the modifications to the opening cover 5, a change in transmittance of the display light may be provided by forming a pattern of vertical stripes, a saw-tooth pattern, or a dotted pattern with low-transmittance paint from the inner sides (221*a*, 223*a*) towards the outer sides (221*b*, 223*b*) of the horizontal ends (221, 223). A change in transmittance may also be provided at the vertical edges. Gradation is provided on the liquid crystal display 22 in the above embodiment, but this example is not limiting. For example, a change in transmittance of the display light may be provided by gradation or the like from the inner sides towards to the outer sides on the projection surface of the transparent cover 4.

The configurations of the first embodiment and the second embodiment may be combined. In other words, a change in color may be provided at the horizontal ends (51, 53) of the opening cover 5 from the opening sides (51*a*, 53*a*) towards the outer sides (51*b*, 53*b*), and a change in transmittance of the display light may be provided at the horizontal ends (221, 223) of the liquid crystal display 22. When combining both configurations, separation due to parallax can be prevented for both virtual images, i.e. the virtual image of the opening cover 5 and the display image by the head-up display apparatus 1. Both virtual images are sometimes visible, for example in the early evening, or even at night because of streetlights. Therefore, adopting the aforementioned configuration can reduce the trouble caused by horizontal separation of the virtual images visible to the driver in a variety of scenarios.

The display source 2 may display a display image that includes a colored background. In this case, the display source 2 may display a display image provided with a change in luminance at the horizontal ends of the display image. This change is preferably provided by gradation, for example. This configuration blurs the display of the edges of the display image, thereby reducing the trouble caused by horizontal separation of the virtual image visible to the driver. In this case, the width of the region provided with a change by gradation or the like may also be changed adaptively in response to the imaging distance of the display image. For example, the region may be increased in width when the imaging distance of the display image is short (less than a predetermined distance), since the degree of separation of the display image due to parallax increases in this case. Conversely, the region may be decreased in width when the imaging distance of the display image is long (equal to or greater than the predetermined distance), since the degree of separation of the display image due to parallax decreases in this case. This configuration adaptively reduces the trouble caused by horizontal separation of the virtual image visible to the driver. The head-up display apparatus 1 may further include a line of sight measurement apparatus that measures the line of sight of both of the driver's eyes. In this case, the line of sight measurement apparatus estimates the distance X1 to a background object on the basis of the convergence angle of the eyes. The separation width y in Expression (2) above can be calculated if X1 can be estimated. The head-up display apparatus 1 then sets the width of the region provided with a change by gradation or the like to be equal to y. When X1 is small, for example, y becomes small, and the region can also be set to a narrow width. In response to the driver's line of sight, this configuration can prevent separation due to parallax to reduce discomfort adaptively and can also ensure as wide a display area as possible.

Although the present disclosure is based on embodiments and drawings, it is to be noted that various changes and modifications will be apparent to those skilled in the art based on the present disclosure. Therefore, such changes and modifications are to be understood as included within the scope of the present disclosure. For example, the functions and the like included in the various means and steps may be reordered in any logically consistent way. Furthermore, means or steps may be combined into one or divided.

REFERENCE SIGNS LIST

1 Head-up display apparatus
2 Display source
3 Reflecting member
4 Transparent cover
5 Opening cover
6 Instrument panel
7 Opening
8 Front windshield
9, 9*b* Display image
10, 10*b* Virtual image
11 Central portion
12, 13 Peripheral portion
21 Backlight
22 Liquid crystal display
221, 223, 51, 53 Horizontal ends
222 Display region
52, 54 Vertical ends

The invention claimed is:

1. A head-up display apparatus comprising:
a display source inside an instrument panel;
an opening on the instrument panel, display light from the display source being emitted through the opening; and
an opening cover provided around the opening;
wherein the opening cover has a change in reflectance increasing from the opening side towards an outer side in a horizontal direction.

2. The head-up display apparatus of claim 1, wherein the opening cover has a change in color or reflectance from the opening side towards an outer side in a vertical direction.

3. The head-up display apparatus of claim 1, wherein the opening cover has a gradation changing from black to a color of the instrument panel from the opening side towards the outer side.

4. The head-up display apparatus of claim 1, wherein the display source has a change in transmittance of the display light from an inner side towards an outer side of an exit surface in a horizontal direction.

5. The head-up display apparatus of claim 4, wherein the display source has a gradation in which transmittance of the display light reduces from the inner side towards the outer side of the exit surface in horizontal direction.

6. The head-up display apparatus of claim 1, wherein the opening cover has a gradation of reflectance increasing from the opening side towards the outer side.

7. The head-up display apparatus of claim 1, wherein the opening cover has at least two stages of the change in reflectance.

8. The head-up display apparatus of claim 1, wherein the change in reflectance is provided by a pattern of vertical stripes.

9. The head-up display apparatus of claim 1, wherein the change in reflectance is provided by a pattern of saw-tooth.

* * * * *